United States Patent
Berkovitz et al.

(10) Patent No.: US 8,762,294 B2
(45) Date of Patent: Jun. 24, 2014

(54) METHOD AND SYSTEM FOR DYNAMIC PRICING

(75) Inventors: Joseph H. Berkovitz, Sudbury, MA (US); Tareef S. Kawaf, Sudbury, MA (US); Robert S. Mason, Lincoln, MA (US); Graham L. Mather, Somerville, MA (US); Joshua S. Spiewak, Sharon, MA (US)

(73) Assignee: Oracle OTC Subsidiary LLC, Redwood Shores, CA (US)

( * ) Notice: Subject to any disclaimer, the term of this patent is extended or adjusted under 35 U.S.C. 154(b) by 1298 days.

(21) Appl. No.: 11/896,552

(22) Filed: Sep. 4, 2007

(65) Prior Publication Data
US 2007/0299790 A1 Dec. 27, 2007

Related U.S. Application Data

(63) Continuation of application No. 09/911,994, filed on Jul. 24, 2001.

(51) Int. Cl.
| | |
|---|---|
| *G06F 17/00* | (2006.01) |
| *G06F 7/00* | (2006.01) |
| *G06Q 10/00* | (2012.01) |
| *G06Q 30/00* | (2012.01) |

(52) U.S. Cl.
USPC .................... 705/400; 705/26.1; 705/1.1

(58) Field of Classification Search
USPC ............. 705/1.1, 7.11–7.35, 400, 26.1
See application file for complete search history.

(56) References Cited

U.S. PATENT DOCUMENTS

| | | | |
|---|---|---|---|
| 4,351,033 A | 9/1982 | Uchimura et al. | |
| 5,758,097 A * | 5/1998 | Debe et al. ................ | 705/35 |
| 5,987,429 A | 11/1999 | Maritzen et al. | |
| 5,999,915 A * | 12/1999 | Nahan et al. ............... | 705/27 |
| 6,058,373 A | 5/2000 | Blinn et al. | |
| 6,195,646 B1 | 2/2001 | Grosh et al. | |
| 6,876,975 B1 | 4/2005 | Zimmerman et al. | |
| 7,035,820 B2 * | 4/2006 | Goodwin et al. .......... | 705/37 |
| 7,343,319 B1 * | 3/2008 | Walker et al. .............. | 705/21 |
| 7,630,986 B1 * | 12/2009 | Herz et al. ................. | 1/1 |
| 2001/0032207 A1 * | 10/2001 | Hartley et al. ............ | 707/102 |
| 2003/0023567 A1 * | 1/2003 | Berkovitz et al. ......... | 705/400 |
| 2003/0115129 A1 * | 6/2003 | Feaver et al. .............. | 705/37 |
| 2007/0061220 A1 * | 3/2007 | Vaid ........................... | 705/26 |

* cited by examiner

*Primary Examiner* — George Chen
(74) *Attorney, Agent, or Firm* — Miles & Stockbridge P.C.

(57) ABSTRACT

A computer system and method for dynamic pricing is described. The system includes at least one dynamic calculator, which performs calculations based upon conditional rules.

11 Claims, 6 Drawing Sheets

METHOD AND SYSTEM FOR DYNAMIC PRICING

RELATED APPLICATION

This application claims the benefit of the following application, the contents of which are incorporated by reference herein: U.S. patent application Ser. No. 09/911,994, entitled Method and System for Dynamic Pricing, filed Jul. 24, 2001.

FIELD OF THE INVENTION

This invention relates to computer systems and, more particularly, to computer systems for generating dynamic pricing information.

BACKGROUND OF THE INVENTION

Various computer pricing mechanisms have been available to date. Typically, these have used a static pricing scheme such as a look-up table of pre-priced items. In such a scheme, each item in a store would have a price and a percentage discount stored in the look-up table. If a customer purchased an item, the system would determine the price of the particular item and whether a discount is to be applied to that item, and calculate a price. If the price of the item changed, or if the discount to the item changed, the look-up table would have to be updated. This would be required for every item on the list.

SUMMARY OF THE INVENTION

According to the present invention, a method and system for dynamic pricing is described. Dynamic pricing is accomplished through the use of at least one dynamic calculator, which performs calculations based upon conditional rules.

In preferred embodiments, the system may include at least one static calculator. Static calculators can include pre-calculators and/or post-processing calculators. Pre-calculators determine an initial price, such as a list price or a sale price. Alternatively, a module may be used to set an initial price. Post-processing calculators make final adjustments based on a price generation algorithm, such as rounding the price to the nearest $0.99.

Between the pre- and post-calculators is at least one dynamic calculator that uses rules-based methodology to dynamically determine discounts to the initial price determined by the pre-calculators. Each dynamic calculator is made up of a qualifier and a discount calculator. The qualifier applies rules to determine if an item is qualified to receive a discount. The rules for qualification generally comprise a condition that must be satisfied. Rules sometimes also include a target upon which to apply the discount. If an item is determined to be qualified to receive a discount, the discount calculator applies it to the price.

DETAILED DESCRIPTION OF PREFERRED EMBODIMENTS

Figure 1:
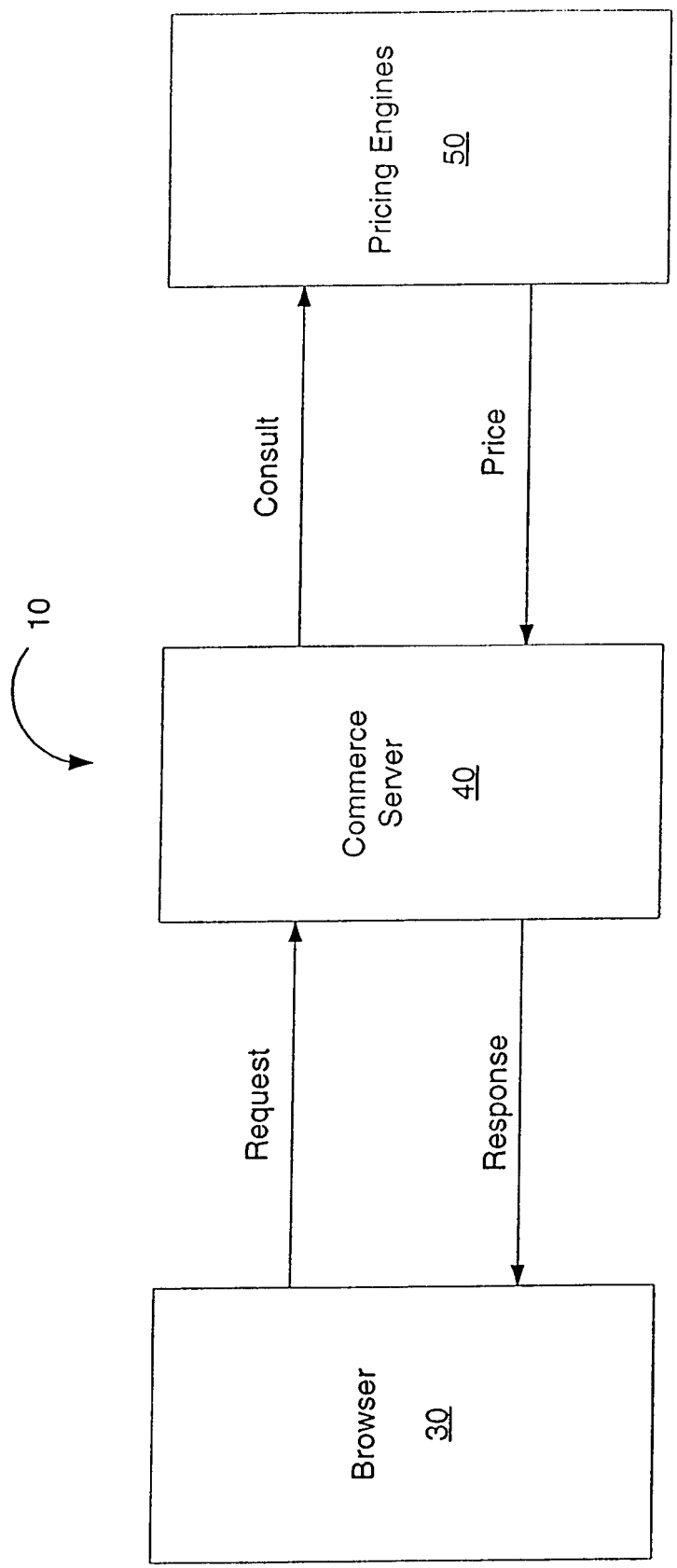
FIG. 1 is a block diagram of components of the pricing system according to an embodiment of the invention.

As shown in FIG. 1, a computer system for customized pricing 10 includes a customer terminal, such as a PC, where a customer can access a web browser 30. The web browser 30 is connected via software and hardware that is well known to those skilled in the art to a commerce server 40. The commerce server 40 is also connected through hardware and software known to those skilled in the art to at least one pricing engine 50.

When the customer decides to shop on the Internet, he accesses a web site on a browser 30 that sells products of interest to him. The customer then selects items that he may be interested in purchasing and makes a request to the commerce server 40. The request may be one of several, such as a request to view a product and the price of the product on the browser or, perhaps, a request to view an entire shopping cart total for the items selected. Once such a request is made, the commerce server 40 consults the pricing engines 50, where a price for the item is determined. Details of this pricing procedure will be addressed below. Once a price is determined, the price is fed through the commerce server 40, and a response is provided to the customer with a specific price for that item.

Figure 2:
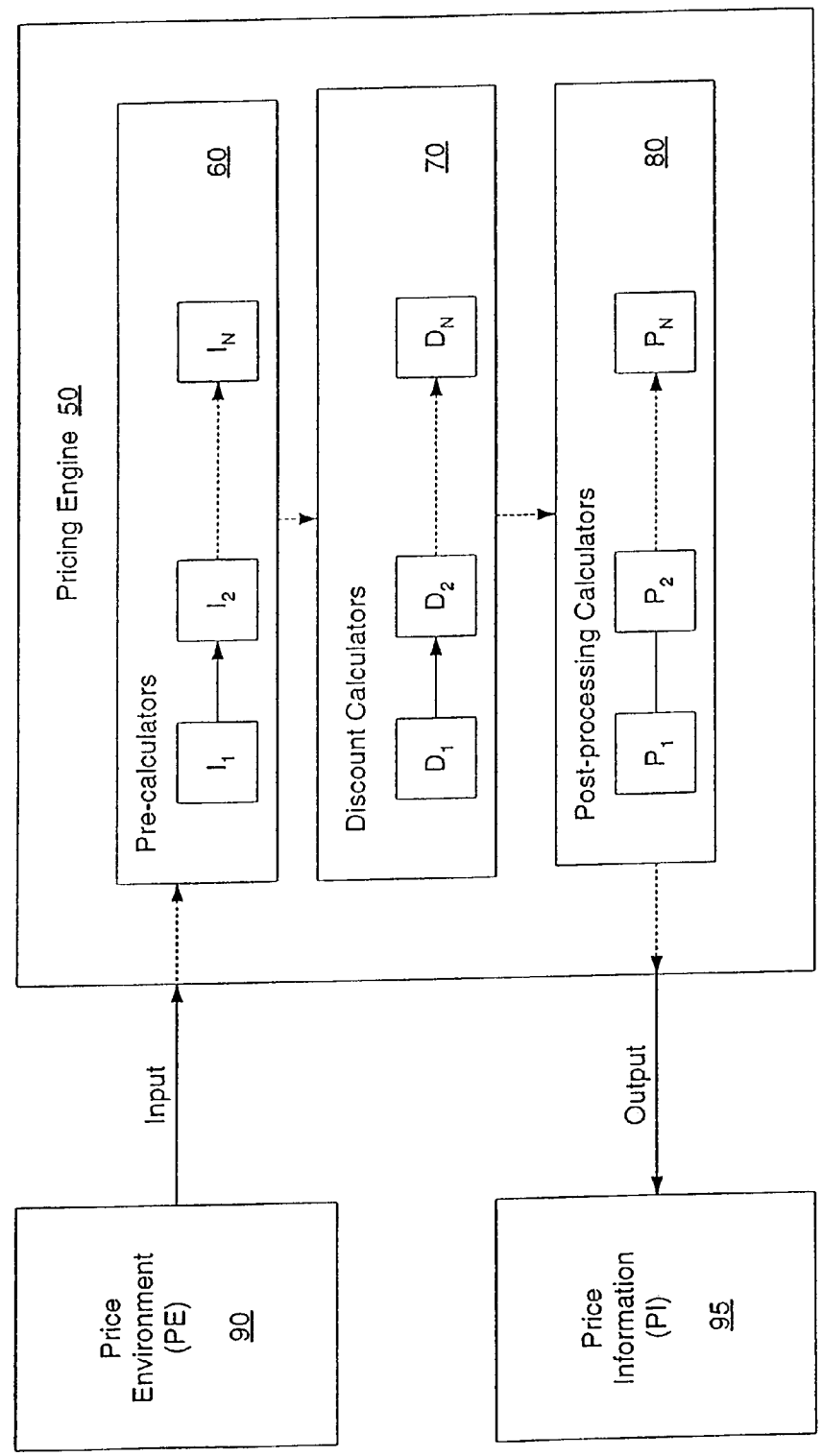
FIG. 2 is a block diagram of a pricing engine according to an embodiment of the invention.

FIG. 2 provides an overview of the pricing engines. A preferred embodiment of the system includes four pricing engines, but any number of engines may be provided. In this particular embodiment (not shown), there is an "items" engine that calculates a price for a particular item, a "shipping" engine that calculates the shipping price of a particular item, a "tax" engine that calculates the applicable tax for a particular item, and an "order engine" that determines the price for all items in the order as well as any shipping costs and applicable taxes. Each separate pricing engine can apply separate discounts to the order. The particular engines included in the system and the determination of which engines will be consulted during a transaction are determined by the website designer. For example, the items engine may display dynamically discounted prices to a customer as the customer browses the site, before the customer has indicated a desire to purchase anything.

Each pricing engine is generally made up of a series of calculators that perform different functions in calculating the price. Price information (PI), which will ultimately provide the price output from the pricing engine, begins in the engine as a blank slate. As it interacts with each system calculator, it includes the most recent price calculation.

Figure 3:
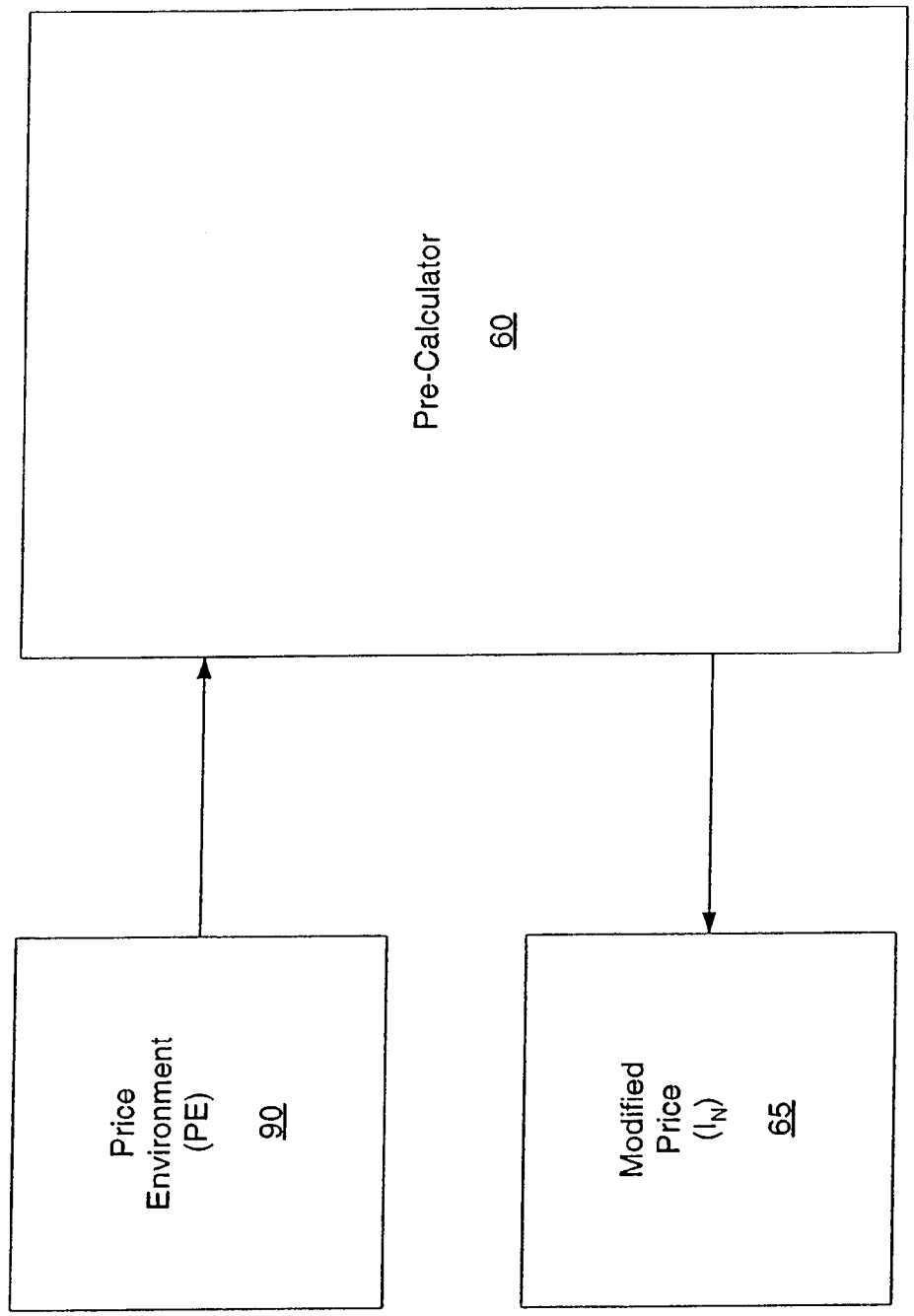
FIG. 3 is a block diagram of a pre-calculator operation according to an embodiment of the invention.

In a preferred embodiment, there are three types of calculators. As depicted in FIGS. 2 and 3, pre-calculators 60 replace the blank Price Information (PI) with an initial price, typically a list price, for the item without any discounting. This can be a price from a typical look-up table, as described in the Background section. Pre-calculators perform only static calculations, which are calculations that are not conditioned on anything. For example, sale prices of items are static calculations because they apply regardless of the conditions under which the order is placed. A series of pre-calculators can be used to apply a series of static calculations to obtain a series of initial prices $I_x$ ($I_x = I_1$ to $I_N$, where N is the number of calculators used). For example, a first pre-calculator can apply the list price $I_1$ to the item and a second pre-calculator can apply a sale price $I_2$ to the same item. Thus, when the pre-calculation is complete, the current price information (PI) is the value of the initial price ($I_N$) 65.

The second series of calculators, discount calculators 70, determine what, if any, discounts are to be applied to the item. "Discounts," here, is used generically and may include either price reductions or price additions. Discount calculators operate on dynamic rules-based methodologies, which will be described in detail below with respect to FIGS. 5 and 6. The rules dynamically determine whether the prices of certain items need to be adjusted from the initial price, and the discount calculators perform that function. A series of discount calculators calculate a series of discount prices $D_x$ ($D_x=D_1$ to $D_N$) by performing the rules-based calculations on the initial price ($I_N$) to calculate a final discount price ($D_N$). This price is output from the discount calculators as the current price information (PI).

Figure 4:
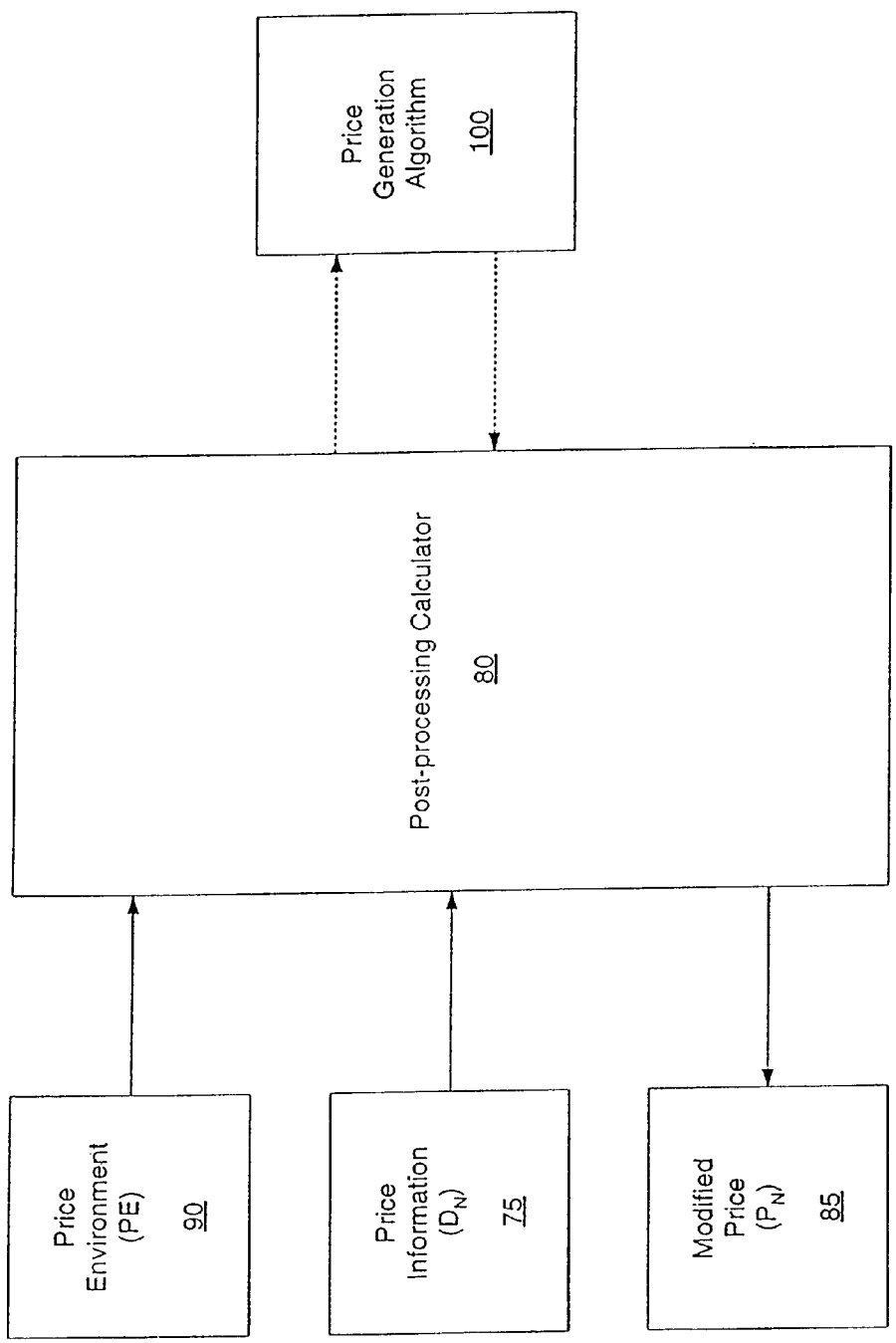
FIG. 4 is a block diagram of a post-processing calculator operation according to an embodiment of the invention.

Finally, as depicted in FIGS. 2 and 4, post-processor calculators 80 modify the discount price ($D_N$) 75 based upon price generation algorithms 100 decided upon by the site designer. For example, an algorithm may round all prices to the nearest $0.99 to make them appear less expensive, or discount the items 15 percent. Accordingly, these post-processing calculators perform static calculations, similar to the pre-calculators. Each separate algorithm is performed by a separate post-processing calculator, and the price information (PI) is updated for each post-processing calculated price $P_x$ ($P_x=P_1$ to $P_N$). Thus, the output of the post-processing calculators $P_N$ (85) is part of the final Price Information (PI) that is output from the pricing engine 50 and sent to the user.

In one embodiment, this final Price Information (PI) includes the price of the order, the price breakdown of all items in the order including any shipping and tax costs, and the price calculation history that details everything that happened to the price as it was adjusted by the various calculators. This pricing metadata would thus include calculations made to the price and the rules used to calculate the price. As such, it can be very useful if a customer subsequently changes the order and a new price must be recompiled. Assuming the rules still exist, they may simply be re-run to determine the new price. If, however, any of the rules had changed in the interim (e.g., because of the later date), the revised rules would be run. Some or all of the Price Information typically would be sent to the user, and some or all of the Price Information typically is stored by the pricing engine or the server for later use.

In other embodiments, the final Price Information (PI) may be different depending on the pricing engine involved and the needs of the particular application. For example, for the "items" pricing engine, the final Price Information may only include the price of an item purchased as well as the price calculation history for that single item.

The operation of the pricing engine will be described generally with respect to FIG. 2. Aspects of a Price Environment (PE) 90 are formulated in the commerce server 40 (FIG. 1) and input into the pricing engine 50. A Price Environment describes the state of the commerce server with respect to a particular user at the time the price is being generated. This environment may include details of the possible transaction, such as the customer profile, which is all information gathered about the user; the locality of the possible purchase, which includes specific geographical information such as the appropriate language and currency to apply; the order at issue, which is shopping cart information including items selected and the shipping information; the products in the order; and the rules governing the discounts to be applied to the order.

Once in the pricing engine, the Price Environment (PE) is sent with the blank Price Information (PI) to the pre-calculators 60 to determine the initial prices for items in the order. As depicted in FIG. 2, there may be multiple pre-calculators acting upon the Price Information (PI). The current Price Information ($I_N$) is then sent to the discount calculators 70 where the discount rules are applied to the items. Again, there may be multiple discount calculators that each apply a separate rule to the Price Information. Finally, the discounted Price Information ($D_N$) is sent to the post-processor calculators 80 where the prices are adjusted in accordance with selected algorithms. After passing through the post-processing calculators, the final Price Information ($P_N$) 95 is output from the pricing engine 50. This entire operation can be implemented with software, which can be provided on media such as magnetic or optical disks.

Figure 5:
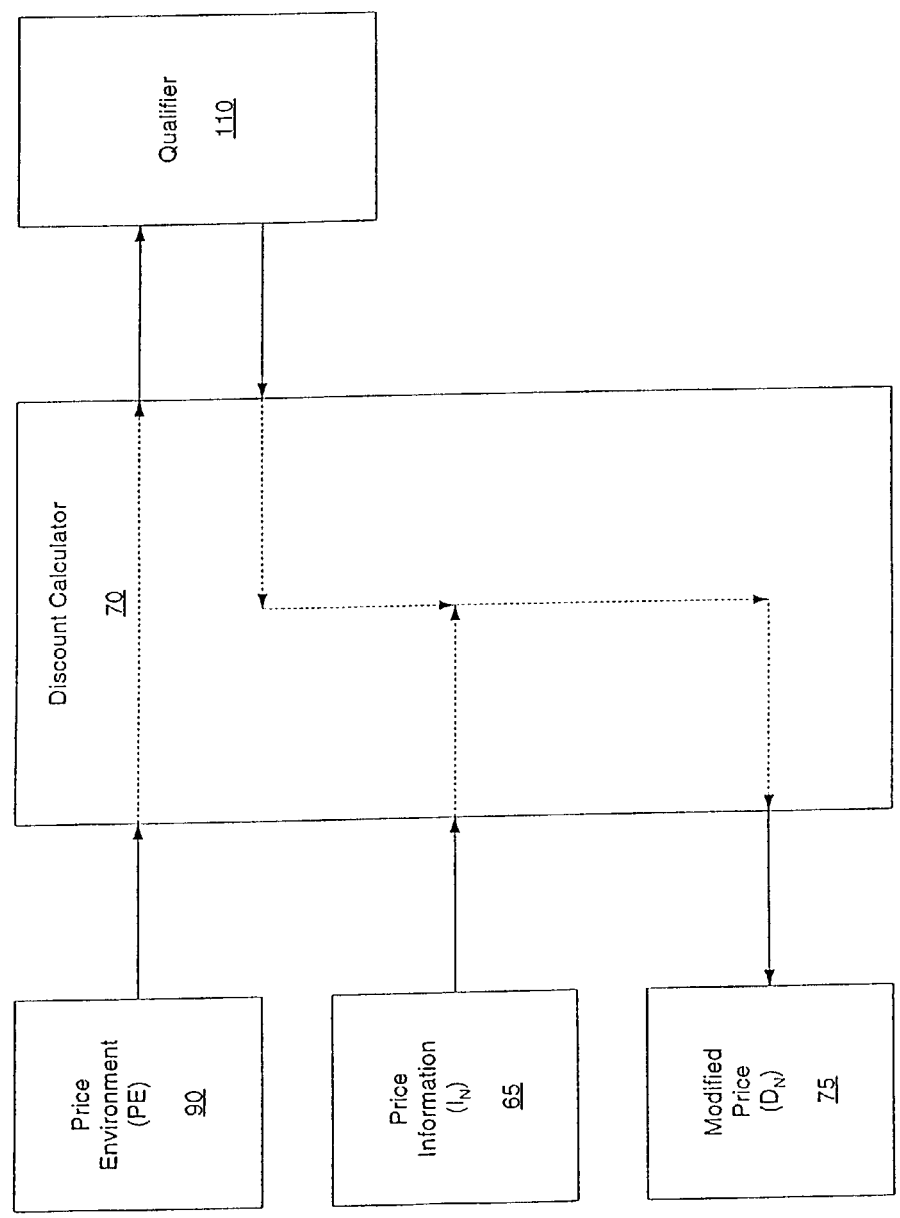
FIG. 5 is a block diagram of a discount calculator operation according to an embodiment of the invention.
Figure 6:
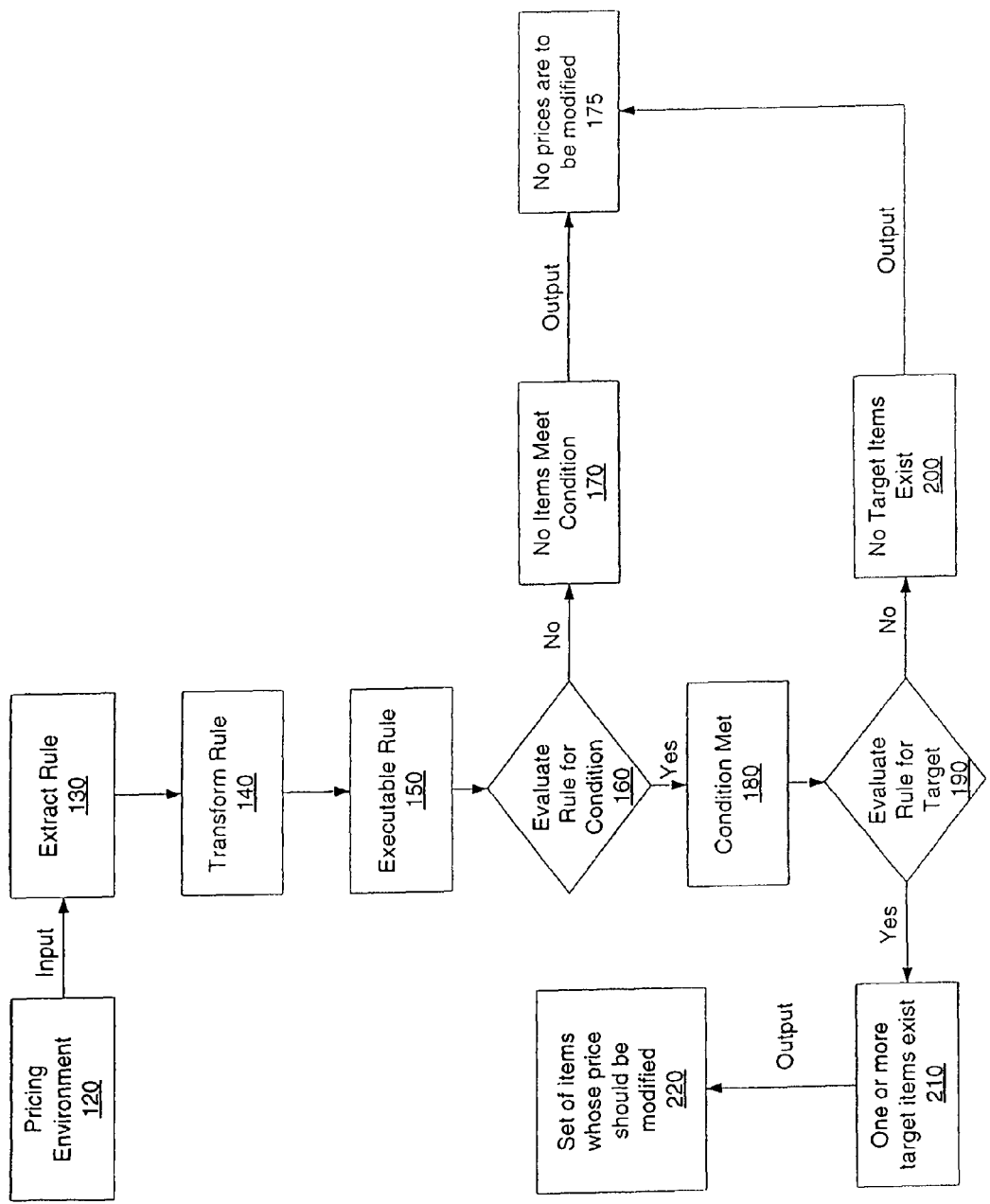
FIG. 6 is a diagram of steps performed during a qualifier operation according to an embodiment of the invention.

Details of the operation of the discount calculators 70 are described with respect to FIGS. 5 and 6. As described above, the Price Environment (PE) 90 and the current Price Information ($I_N$) 65 is input to the series of discount calculators 70 from the pre-calculators 60. In this section, the operation of a single discount calculator will be described. Of course, in accordance with the invention as described above, many discount calculators may be applied. The Price Environment passes through the discount calculators to a qualifier operation 110, which applies the rules of the particular Price Environment and will be described in detail with respect to FIG. 6.

The rules determine the situations when it is appropriate to allow the discount calculator to perform a calculation. For example, the rule may require a ten percent discount to be applied to blue shirts when the customer has purchased more than four items. Thus, when the order "qualifies" for the discount by including five items, the discount is applied to the blue shirts. As is evident, this rule has two parts, a condition and a target. If both parts are present in the rule, both must be satisfied for the rule to apply. The condition is what is required for the discount to be applied. Here, the condition is satisfied if the customer purchases five or more items. The target is the particular item or items that will be discounted. Here, the target is blue shirts. In this instance, both the condition and the target are satisfied, and the ten percent discount can be applied in the discount calculator. Alternatively, a rule may only have a condition, and not a target. For example, if an order has more than four items, discount everything ten percent.

In one embodiment, the particular rules are input by a site designer in a pricing model description language via a user interface. Rules-based pricing permits many advantages. It allows for tremendous flexibility in determining what should be discounted and what the discount should be. It can determine whether every user gets a discount (e.g., a ten percent discount on red items) or if only certain users get a selective discount if they perform a specific task (e.g., a ten percent discount if the order has more than four items). Rules may also implement personal coupons or promotions that are targeted to the customer, and may incorporate specific dates upon which a discount is to be applied.

Rules also allow for categorical discounting. They are not necessarily tied to the particular items, but also can be based upon metadata about the items (e.g., the color of the item). A rules-based system allows a rule to be applied to all products sold on the web site. For example, if a rule allows discounting of red items on Valentine's Day, it will be applied to all red items sold on the site. This avoids a need to price each item individually, with discounts to items being made item by item. This categorical discounting may even be applied to items that are added to the site in the future.

Turning back to the operation of the system, the steps of the qualifier operation are described in more detail in FIG. 6. The qualifier operation 110 begins by inputting the Price Environment 120. Next, the qualifier extracts a rule from the Price Environment 130. In one embodiment, the extracted rule is stored in a database field in text format, such as XML. The rule is then transformed 140 into an executable rule 150, which is in a format to allow for the execution of the rule, such as Java.

The rule is then evaluated to determine whether the Price Environment meets the rule condition 160. If no items meet this condition 170, the output of the qualifier indicates to the discount calculators that no prices are to be modified 175. If the condition is met 180, the rule is evaluated to determine whether the target exists in the Price Environment 190. If no target items exist 200, then the output of the qualifier indicates to the discount calculators that no prices are to be modified 175. If the target item does exist 210, then the output of the qualifier provides a set of items to the discount calculators in which the prices must be modified according to the rule 220.

Returning to FIG. 5, when the set of items to be discounted are input to the discount calculators 70, they are matched to the Price Information ($I_N$) 65 that was input from the pre-calculators. The prices of those items are then modified in accordance with the rule to result in modified price ($D_N$) 75. The Price Information now contains the modified price, which is then output to the post-processing calculators for further processing, as described above.

While there have been shown and described examples of the present invention, it will be readily apparent to those skilled in the art that various changes and modifications may be made therein without departing from the scope of the invention as defined by the appended claims. The preferred embodiments have been described in terms of a web-based system, but the invention is equally applicable to a wireless, phone-based, or any other network-based system. It can even be used in retail stores.

Moreover, there may be different pricing engines applied to an order, and within each pricing engine there may be different calculators. For example, it is not necessary that the static and dynamic operations be performed on separate calculators. A single calculator may be capable of both static and dynamic calculations. Also, it is not necessary to include pre-calculators to set the initial price. A module having a fixed price operation could be used to set the blank Price Information to an initial price, and then dynamic calculators could modify that price as appropriate. In addition, the Price Environment may include different information, as might the Price Information. Accordingly, the invention is limited only by the following claims and equivalents thereto.

What is claimed is:

1. A non-transitory computer-readable medium having instructions stored thereon that, when executed by a processor, cause the processor to perform dynamic pricing of at least one item of an order, the performing comprising:
   providing a pricing engine configured to make modifications to a price to be paid by a customer;
   providing price environment input comprising customer information, order information, item information, and conditional rules, wherein the conditional rules comprise a condition that must be satisfied for the at least one item to qualify for a discount and a target upon which to apply the discount, and wherein the target is defined based upon metadata about the at least one item;
   extracting the conditional rules from the price environment and storing the conditional rules in a database;
   initially determining the price for the at least one item that is not conditional;
   determining that the at least one item is part of the target of the extracted conditional rules based upon the metadata about the at least one item;
   modifying the price for the at least one item based upon the extracted conditional rules;
   modifying the price for the at least one item based upon at least one pricing algorithm; and
   providing a price information output comprising the price of the order and the price calculation history for all individual items in the order, the price calculation history including the calculations made and conditional rules used to calculate the price of an item.

2. The non-transitory computer-readable medium of claim 1, the performing further comprising:
   receiving a price information input, comprising the price of the order and the price calculation history for all individual items in the order including the calculations made and rules used to calculate the price of an item.

3. The non-transitory computer-readable medium of claim 2 wherein, when the order changes, the rules are re-run to determine the new price of each item in the order.

4. The computer program product of claim 1, wherein the conditional rules of the price environment depend upon at least one of the customer information, the order information, or the item information.

5. The computer program product of claim 1, wherein the price is reduced for the at least one item.

6. A computer implemented method for dynamic pricing of at least one item of an order, the computer implemented method comprising:
   providing a pricing engine for calculating a price to be paid by a customer;
   providing a price environment input to the pricing engine comprising customer information, order information item information, and conditional rules, wherein the conditional rules comprise a condition that must be satisfied for the at least one item to qualify for a discount and a target upon which to apply the discount, and wherein the target is defined based upon metadata about the at least one item;
   extracting the conditional rules from the price environment and storing the conditional rules in a database on a computer;
   statically calculating, by the computer, the price for the at least one item;
   determining that the at least one item is part of the target of the extracted conditional rules based upon the metadata about the at least one item;
   dynamically calculating, by the computer, the price for the at least one item based upon the extracted conditional rules, wherein the conditional rules are transformed into an executable rule to run on the computer;
   statically calculating, by the computer, the price for the at least one item based upon at least one pricing algorithm; and
   providing a price information output from the pricing engine comprising the price of the order and the price calculation history for all individual items in the order, the price calculation history including the calculations made and conditional rules used to calculate the price of an item.

7. The method of claim 6 further comprising:
   providing a price information input to the pricing engine, comprising the price of the order and the price calculation history for all individual items in the order including the calculations made and rules used to calculate the price of an item.

8. The method of claim 7 wherein, when the order changes, the rules input to the pricing engine are re-run to determine the new price of each item in the order.

9. A computer system for dynamic pricing of at least one item of an order comprising:
   a non-transitory computer-readable medium;
   a pricing engine for making modifications to a price to be paid by a customer;
   a price environment input to the pricing engine comprising customer information, order information, item information, and conditional rules, wherein the conditional rules comprise a condition that must be satisfied for the at least one item to qualify for a discount and a target upon which to apply the discount, and wherein the target is defined based upon metadata about the at least one item;
   a qualifier for extracting the conditional rules from the price environment and storing the conditional rules in a database;
   at least one first static calculator for initially determining the price for the at least one item that is not conditional;
   at least one dynamic calculator for determining that the at least one item is part of the target of the extracted conditional rules based upon the metadata about the at least one item, and modifying the price for the at least one item based upon the extracted conditional rules;
   at least one second static calculator for modifying the price for the at least one item based upon at least one pricing algorithm; and
   a price information output from the pricing engine comprising the price of the order and the price calculation history for all individual items in the order, the price calculation history including the calculations made and conditional rules used to calculate the price of an item.

10. The computer system of claim 9 further comprising:
    a price information input to the pricing engine, comprising the price of the order and the price calculation history for all individual items in the order including the calculations made and rules used to calculate the price of an item.

11. The computer system of claim 10 wherein, when the order changes, the rules input to the pricing engine are re-run to determine the new price of each item in the order.

\* \* \* \* \*